July 20, 1937.  M. A. JUDD  2,087,875
DISHCLOTH
Filed Sept. 24, 1935
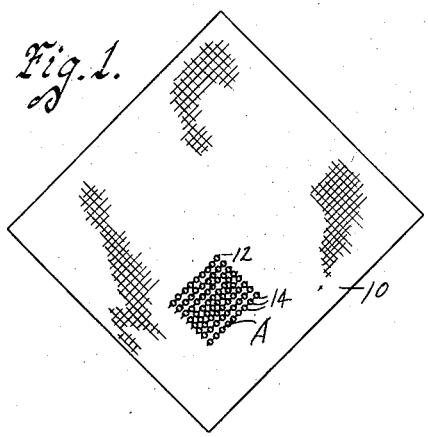
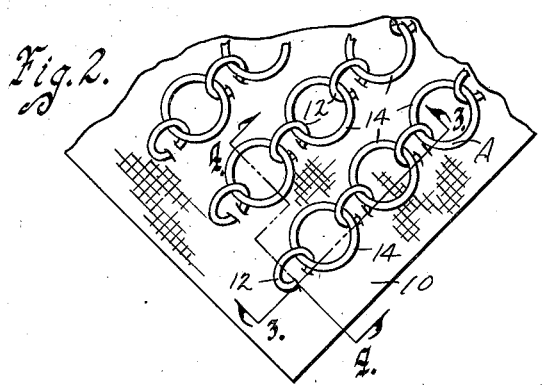
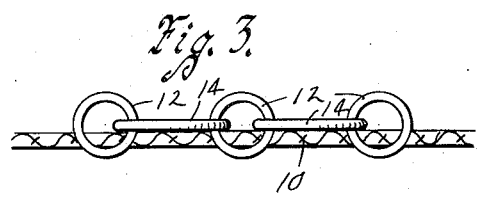
Inventor
Millie A. Judd
by Bair, Freeman & Sinclair
Attorneys
Witness
H. S. Mungenmaier Patented July 20, 1937

2,087,875

UNITED STATES PATENT OFFICE 2,087,875

DISHCLOTH

Millie A. Judd, Des Moines, Iowa

Application September 24, 1935, Serial No. 41,903

1 Claim. (Cl. 15—208)

The object of my invention is to provide a dish cloth having combined therewith a scraping means of simple, durable and comparatively inexpensive construction.

A further object is to provide a cloth for washing dishes with a metallic scraping means located in substantially the center of one fourth of the dish cloth, whereby the scraping means may be exposed for use in scraping pots, pans or dishes or the dish cloth may be folded with the scraping means on the inside when it is not desired to use the scraping means but the cloth only as a dish washing cloth.

Still a further object is to provide the combination of a dish cloth and scraping means, the scraping means comprising a plurality of rows of metallic rings, certain of the rings being extended through the dish cloth for securing the scraping means on the cloth.

With these and other objects in view my invention consists in the construction, arrangement and combination of the various parts of my device, whereby the objects contemplated are attained, as hereinafter more fully set forth, pointed out in my claim and illustrated in the accompanying drawing, in which:

Figure 1 is a plan view of a dish cloth spread in open position and illustrating my scraping means secured thereto.

Figure 2 is an enlarged plan view of the scraping means showing the plurality of rings and, in detail, the manner in which they are secured to the dish cloth.

Figure 3 is a sectional view on the line 3—3 of Figure 2, further illustrating the manner in which the scraping means may be secured to the dish cloth.

On the accompanying drawing, I have used the reference numeral 10 to indicate a dish cloth of any desired material or weave, and the reference character A to indicate generally the scraping means.

It will be noted that the scraping means A is located substantially in the center of one fourth of the dish cloth 10 (see Figure 1) which makes it convenient to fold the dish cloth into four thicknesses with the scraping means either inside or on the outer surface of the dish cloth for dish washing or dish scraping operations respectively as illustrated.

The scraping means A consists of a plurality of metallic rings 12 which may be made either of a suitable metal or some other composition as desired. Rings 14 alternate with and connect the rings 12 together.

The scraping means A may be secured to the dish cloth 10 in any desired manner, such for instance as shown in Figures 2 and 3 with the rings extending through the dish cloth 10.

Having disclosed different embodiments of my invention, I will now particularly point out its uses and advantages. By combining the scraper with the dish cloth, an article is provided which not only saves time and labor but reduces the purchasing cost and does the work of both scraper and washing more efficiently. It is more economical for the manufacturer to make and sell a dish cloth with the scraper attached thereto than it is to sell them separately and accordingly he can furnish the combined scraper and cloth at less cost than if two parts are manufactured and sold separately. Attachment of a scraper of the kind disclosed to a dish cloth is an improvement on the old fashioned, yet indispensable, cloth because of the savings above noted.

By providing a scraper of the kind disclosed, that is, one comprising metallic rings, the advantage of the abrasive action of the metal is secured without the possibility of any scratching or discoloring of the article or surface being cleaned. Metal rings present only rounded surfaces to the surface being cleaned and this is especially desirable in connection with the scraping of aluminum pans and the like, which are of material quite susceptible to scratching when scraped with a sharp edged instrument.

The rings are comparatively open as compared to scrapers of steel wool and similar devices, which promotes sanitation because the scraper is easily cleaned. As a matter of fact, the scraper is self-cleansing since the washing of dish water through the scraper as the dish cloth is used, cleans the rings automatically. It is obvious that when the rings are cleaned both the life of the scraper and the dish cloth are prolonged.

By reference to Figure 3 it will be noted that most of the scraper is on one side of the cloth, although a little of it projects on the other side. This makes the scraper reversible for heavy scraping or for light scraping as desired.

With respect to the laundering of the dish cloth, it can be laundered just as readily as though the scraper were not on it. It can pass through a wringer without injury to either the cloth, the wringer or the scraping means attached to the cloth.

Although I have shown the outline of the scraper as being square, it is obvious that changes in shape and many others may be made without departing from the real spirit and purpose of my invention and it is my intention to cover by my claim any modified forms of structure or use of mechanical equivalents which may be reasonably included within its scope.

I claim as my invention:

In a device of the character disclosed, the combination of a dish washing cloth and scraping means thereon, said scraping means comprising a plurality of rings arranged in rows, the rings of each row being successively fastened together and spaced rings of each row extending through said dish washing cloth for securing said scraping means thereto.

MILLIE A. JUDD.